(12) United States Patent
Yoneda et al.

(10) Patent No.: US 7,961,394 B2
(45) Date of Patent: Jun. 14, 2011

(54) POLARIZING GLASS, OPTICAL ISOLATOR, AND METHOD FOR PRODUCING POLARIZING GLASS

(75) Inventors: Yoshitaka Yoneda, Tokyo (JP);
Michiyori Miura, Tokyo (JP); Seiichi Yokoyama, Tokyo (JP)

(73) Assignee: Hoya Candeo Optronics Corporation, Toda-shi (JP)

( * ) Notice: Subject to any disclaimer, the term of this patent is extended or adjusted under 35 U.S.C. 154(b) by 0 days.

(21) Appl. No.: 12/669,058

(22) PCT Filed: Mar. 26, 2009

(86) PCT No.: PCT/JP2009/056048
§ 371 (c)(1),
(2), (4) Date: Apr. 7, 2010

(87) PCT Pub. No.: WO2009/130966
PCT Pub. Date: Oct. 29, 2009

(65) Prior Publication Data
US 2010/0284074 A1    Nov. 11, 2010

(30) Foreign Application Priority Data

Apr. 21, 2008  (JP) ................................. 2008-110652

(51) Int. Cl.
*G02B 5/30* (2006.01)

(52) U.S. Cl. ......................................................... 359/492
(58) Field of Classification Search .................. 359/492, 359/490, 501
See application file for complete search history.

(56) References Cited

U.S. PATENT DOCUMENTS

2006/0039071 A1*  2/2006  Naylor et al. ................. 359/501
2008/0186576 A1*  8/2008  Takada ........................... 359/492

FOREIGN PATENT DOCUMENTS

JP    5 150117    6/1993
JP    2007 248541    9/2007

* cited by examiner

*Primary Examiner* — Joshua L Pritchett
(74) *Attorney, Agent, or Firm* — Oblon, Spivak, McClelland, Maier & Neustadt, L.L.P.

(57) ABSTRACT

A polarizing glass includes shape-anisotropic metal particles oriented and dispersed in a glass substrate, the concentration of the metal particles having a distribution in which in the travel direction of light in which a polarizing function is exhibited, the concentration is substantially zero near one of the surfaces of the glass substrate and near the other surface, gradually increases from one of the surfaces of the glass substrate to the other surface, becomes a value within a predetermined range in the glass substrate, and then gradually decreases toward the other surface.

11 Claims, 7 Drawing Sheets

POLARIZING GLASS, OPTICAL ISOLATOR, AND METHOD FOR PRODUCING POLARIZING GLASS

TECHNICAL FIELD

The present invention relates to a polarizing glass used as a polarizer which is an important component of a small optical isolator, an optical switch, an electromagnetic sensor, or the like, used in, for example, optical communication, an optical isolator, and a method for producing a polarizing glass.

BACKGROUND ART

A glass containing shape-anisotropic metal fine particles, for example, silver particles or copper particles, oriented and dispersed therein is known to serve as a polarizer because the light absorption wavelength band of the metal varies depending on the direction of incident polarized light. The term "shape anisotropy" represents that longitudinal dimension and lateral dimension are different. The term "oriented" represents that the longitudinal directions of many shape-anisotropic particles are oriented in a specified direction. The term "dispersed" represents that shape-anisotropic particles are arranged with spaces.

The above-described polarizing glass is produced by, for example, performing ion exchange treatment of both main surfaces of a glass substrate to introduce Ag ions into the glass from both main surfaces thereof, forming Ag colloidal fine particles by heat treatment, and then stretching the glass substrate to provide the Ag fine particle with shape anisotropy, thereby producing a polarizing glass (refer to Non-Patent Document 1). The polarizing glass can be relatively easily produced and can be decreased in production cost, and thus the polarizing glass is attracting attention.

[Non-Patent Document 1] K. J. Berg Glass Sci. Technol. 68 C1 (1995), p554

DISCLOSURE OF INVENTION

Problems to be Solved by the Invention

In the above-described polarizing glass, a region where silver particles produced by ion exchange are present is limited to a very thin layer near a surface of the glass. In addition, the thickness of the glass is decreased by further stretching, and in the polarizing glass having a total thickness of 200 μm, stretched silver particles are generally present in a very thin layer of about 2 to 5 μm from a surface. FIG. 5 is an explanatory view of a conventional polarizing glass, in which FIG. 5(a) is a partial sectional view of a conventional polarizing glass, and FIG. 5(b) is a diagram showing an Ag particle concentration distribution in the travel direction of light in which a polarization function is performed in a conventional polarizing glass. As shown in FIG. 5, in a conventional polarizing glass 10, silver fine particles 13 having shape anisotropy are oriented and dispersed in regions 14 near both main surfaces of a glass substrate 12 serving as a glass base. FIG. 5(b) shows an Ag particle concentration distribution shown by a decay curve in which the concentration is high near the surfaces of the glass substrate 12 and decreases inwardly.

It was found that the manufacture of an optical isolator using the polarizing glass has the following disadvantages. The disadvantages are described below. FIG. 6 is an explanatory view of the operation of an optical isolator formed using a conventional polarizing glass. In FIG. 6, an optical isolator 100 includes a garnet crystal 20 serving as a Faraday rotator and disposed between two polarizing glasses 10a and 10b having polarization axes inclined at 45° with respect to each other, the garnet crystal 20 being sandwiched between two permanent magnets 30a and 30b so that it is put under a magnetic field thereof. Each of the polarizing glasses 10a and 10b contains shape-anisotropic silver particles oriented and dispersed in one direction near both main surfaces of a glass substrate and having such a distribution as shown in FIG. 5.

Consideration is given to the case in which light emitted from a LD light source 40 disposed on the left of the optical isolator 100 as shown in FIG. 6 passes through the optical isolator 100 and reaches an optical fiber 50 disposed on the right as shown in FIG. 6. The light emitted from the LD light source 40 has perpendicular light components a and b. When the light passes through the polarizing glass 10a of the optical isolator 100, however, of the light components a and b, the light component a parallel to the stretch direction of the metal is absorbed, and only light including the light component b in the vertical direction is transmitted. The light (linearly polarized light) of transmitted light component b becomes light having light component c due to 45° Faraday rotation of the plane of polarization when passing through the garnet crystal 20. The component c light passes through the polarizing glass 10b having the polarization axis at 45° with respect to the polarizing glass 10a and is incident on the optical fiber 50 and transmitted.

When the transmitted light returns due to a defect such as disconnection in the optical fiber, the linearly polarized wave of light is broken to produce light having light components d1, d2, etc., which is incident on the polarizing glass 10b. Of the incident light, only light (linearly polarized light) having component e which has the same plane of polarization as that of the light component c can pass through the polarizing glass 10b. When the component c light is incident on the garnet crystal 20 and passes therethrough, the light becomes component f light due to 45° rotation of the plane of polarization. Since the plane of polarization of the light component f is perpendicular to the polarization axis of the polarizing glass 10a, the light component f is originally completely absorbed. Therefore, return light from the optical fiber 50 should be inhibited from returning to the LD light source. When return light is incident on the LD light source, light output fluctuates and becomes unstable, the optical isolator is used for preventing light return to the LD light source and is indispensable in optical communication with high reliability.

However, as a result of investigation performed by the inventors of the present invention, it was found that isolation actually achieved by the optical isolator using the above-described polarizing glass is significantly smaller than that estimated from the performance of the polarizing glass, and the like. As a result of study of the cause for this, the following fact was found. The fact is described below. In FIG. 6, as described above, since the plane of polarization of the light component f which is return light is perpendicular to the polarization axis of the polarizing glass 10a, the light component f is substantially completely absorbed. However, part of the component f light which is originally absorbed by plasma is reflected by the surface of the polarizing glass 10a on the side bonded to the garnet crystal 20 because of a high concentration of silver particles and propagates as light α in the garnet crystal 20 toward the polarizing glass 10b on the optical fiber 50 side. At the same time, the light α becomes component g light due to 45° rotation of the plane of polarization during propagation in the garnet crystal 20 and reaches the polarizing glass 10b. In the polarizing glass 10b, part of light α of the component g is reflected because of a high concentration of silver particles near the surface and propagates as light β in the garnet crystal 20. The light β also becomes component h light due to 45° rotation of the plane of polarization during propagation in the garnet crystal 20 and again reaches the polarizing glass 10a. Since the component h is a polarized wave which can pass through the polarizing glass 10a because the plane of polarization of the component h is the same as that of the component b, the component h light passes through the polarizing glass 10a and is incident on the LD light source, thereby degrading isolation performance.

The above-described surface reflection in the polarizing glasses 10a and 10b is due to the high metal concentration near the surfaces of the polarizing glasses 10a and 10b. Therefore, the surface reflection is basically not improved even by providing antireflective films (AR coat) on both main surfaces of the polarizing glasses 10a and 10b. When the light emitted from the LD light source 40 is first incident on the polarizing glass 10a, reflected light can be prevented from returning directly to the light source by slightly inclining the integral isolator 100 including the polarizing glass 10a, the garnet crystal 20, and the polarizing glass 10b. However, when transmitted light to the optical fiber 50 returns as return light, the return light cannot be prevented even by inclining the polarizing glass, and thus the return light due to the low isolation of the optical isolator 100 is incident on the light source.

In the optical isolator using the polarizing glass, isolation (Iso: dB) indicating the performance index is calculated according to the following equation:

$$Iso(dB) = -10 \log \{R^n + 10^{[-X/10]}\} \qquad (1)$$

wherein R represents reflectance of linearly polarized light in the absorption direction of a polarizing glass, n represents the number of times of reflection, and X represents Iso(dB) of the isolator when the reflectance R of the polarizing glass is 0. As shown in FIG. 6, return light is reflected a total of two times, and isolation deteriorates by $R^2$ from that at reflection of 0. For example, when the reflection R is 3% at X of 40 dB, Iso is calculated at 30 dB by the equation (1).

FIG. 7 is a graph showing a relationship between reflectance R of linearly polarized light in the absorption direction of a polarizing glass and isolation (Iso: dB). The figure shows the cases of Iso (dB) X of an isolator of 40 dB, 35 dB, and 32 dB when the reflectance R of the polarizing glass is 0. The figure indicates that when an optical isolator is formed using a polarizing glass having a high concentration of shape-anisotropic metal fine particles at the surfaces, the influence of reflectance cannot be neglected. Even when isolation is 40 dB at the reflectance of 0, at the reflectance exceeding 3%, the isolation is less than 30 dB which is the lower limit of the isolation specification, thereby decreasing performance.

Further, in the method of producing a polarizing glass by stretching a glass sheet having metal fine particle-containing layers at both main surfaces, the thickness of a layer containing shape-anisotropic metal particles is as small as several μm. Therefore, when the thickness of the polarizing glass sheet after stretching is adjusted to a target thickness by polishing or the like, the metal fine particles are removed by polishing. There is thus the problem of difficulty in adjusting the thickness of the polarizing glass to a predetermined value. If the thickness of the polarizing glass is not uniform, for example, when many optical isolators are combined, the thickness of an integral isolator formed by bonding polarizing glasses to both sides of a garnet film is not uniform, and the size of a holder which holds the isolator is not constant, thereby causing a large problem in production that mass-production of holders is impossible.

The present invention has been achieved under the above-mentioned background, and an object is to provide a polarizing glass which can be relatively easily produced and which has no problem of surface reflection, an optical isolator, and a method of producing a polarizing glass.

Means for Solving the Problems

Means for solving the above-described problems is as follows:

(1) A polarizing glass including shape-anisotropic metal particles oriented and dispersed in a glass substrate, the concentration of the metal particles having a distribution in which in the travel direction of light in which a polarization function is exhibited, the concentration is substantially zero near one of the surfaces of the glass substrate and near the other surface, gradually increases from one of the surfaces of the glass substrate to the other surface, becomes a value within a predetermined range in the glass substrate, and then gradually decreases toward the other surface.

(2) The polarizing glass described in (1), wherein the metal particles are metallic silver fine particles or metallic copper fine particles.

(3) The polarizing glass described in (1) or (2), wherein the total thickness of a layer containing the shape-anisotropic metal particles is 20 μm or less.

(4) The polarizing glass described in any one of (1) to (3), wherein the total thickness of the polarizing glass is 50 μm or less.

(5) The polarizing glass described in any one of (1) to (4), wherein the extinction ratio for one or both of light in a wavelength band having a center wavelength of 1.31 μm and light in a wavelength band having a center wavelength of 1.55 μm is 30 dB or more.

(6) An optical isolator including the polarizing glass described in any one of (1) to (5).

(7) An optical isolator including a Faraday rotating element and at least one polarizer as components, wherein the polarizing glass described in any one of (1) to (5) is used as the polarizer.

(8) A method for producing a polarizing glass containing shape-anisotropic metal particles oriented and dispersed in a glass substrate, the method including:

bonding two polarizing glasses each having a metal particle-containing layer on at least one of the main surfaces so that the orientation directions of the metal particles coincide with each other and the main surfaces having the metal particle-containing layers face each other, the metal particle-containing layer having a concentration distribution in which the concentration of the shape-anisotropic metal particles is high near the surface and decreases in the inward direction; and when a metal particle layer is present on the other unbonded main surface, removing the metal particle-containing layer.

The metal particle concentration of the produced polarizing glass has a distribution in which in the travel direction of light in which a polarizing function is exhibited, the concentration is substantially zero near one of the surfaces of the glass substrate and near the other surface, gradually increases from one of the surfaces of the glass substrate to the other surface, becomes a value within a predetermined range in the glass substrate, and then gradually decreases toward the other surface.

(9) A method for producing a polarizing glass, including:

introducing metal ions into the main surfaces of a glass substrate by an ion exchange process to prepare a metal ion-containing glass substrate including a metal ion-containing layer having a concentration distribution in which the metal ion concentration is high near the glass surfaces and decreases in the inward direction;

heating the metal ion-containing glass substrate to produce metal particles and prepare a metal particle-containing glass substrate including a metal particle-containing layer having a concentration distribution in which the metal particle concentration is high near the surfaces of the glass substrate, and decreases in the inward direction; and preparing two metal particle-containing glass substrates, bonding together the glass substrate surfaces where the metal particles are produced, and then heat-stretching the glass substrates to form the metal particles into shape-anisotropic metal particles oriented in one direction.

The metal particle concentration of the produced polarizing glass has a distribution in which in the travel direction of light in which a polarizing function is exhibited, the concentration is substantially zero near one of the surfaces of the glass substrate and near the other surface, gradually increases from one of the surfaces of the glass substrate to the other surface, becomes a value within a predetermined range in the glass substrate, and then gradually decreases toward the other surface.

Advantages

According to the present invention, a polarizing glass without the problem of surface reflection can be produced even by a relatively simple method of introducing metal ions into a glass surface by an ion exchange process, heating the glass to produce metal particles, and then stretching the glass. In addition, substantially no shape-isotropic particle is present near a surface, and thus a polarizing glass can be controlled to a predetermined thickness by removing a portion near the surface by means of polishing, etching, or the like. Further, a layer containing shape-anisotropic metal particles in a central portion in the travel direction (thickness direction) of light tin which a polarizing function is exhibited has a thickness of as small as 10 μm or less in total. Therefore, a thin polarizing glass having a thickness of 50 μm or less can be easily produced without deterioration in polarization characteristics.

BEST MODE FOR CARRYING OUT THE INVENTION

FIG. 1 is an explanatory view of a polarizing glass according to Embodiment 1 of the present invention, in which FIG. 1(a) is a partial sectional view of a polarizing glass, according to Embodiment 1 of the present invention and FIG. 1(b) is a diagram showing a concentration distribution of metal particles of Ag or the like in the travel direction of light in which a polarizing function is performed in the polarizing glass according to Embodiment 1 of the present invention. As shown in FIG. 1, in a polarizing glass 1 according to Embodiment 1, metal fine particles 3 having shape anisotropy are oriented and dispersed in a glass substrate 2 serving as a glass base. The dimension of the metal fine particles 3 in the longitudinal direction is 50 to 210 nm, and the dimension in a direction perpendicular to the longitudinal direction is about 10 to 30 nm.

As shown in FIG. 1, the longitudinal direction of the metal fine particles 3 is perpendicular to the travel direction (thickness direction) of light L to be subjected to the polarizing function. As shown in FIG. 1(b), the concentration of the metal particles has a distribution in the travel direction of light to be subjected to the polarizing function in which the concentration is substantially zero near one of the surfaces of the glass substrate 2 and near the other surface, gradually increases from one of the surfaces of the glass substrate 2 to the other surface, becomes the maximum near the center of the glass substrate 2, and then gradually decreases toward the other surface. The concentration near the center may be about $1 \times 10^8$ to $1 \times 10^{12}$ particles/mm$^3$. The thickness t1 of the polarizing glass 1 is 0.03 to 0.6 mm, and the thickness t2 of a region 4 where the metal particles are present is 5 to 30 μm.

FIG. 2 is an explanatory view of a process for producing the polarizing glass 1 according to Embodiment 1. The process for producing the polarizing glass 1 according to Embodiment 1 is described below with reference to FIG. 2. First, two conventional polarizing glasses 10 shown in FIG. 5 are prepared (refer to FIG. 2(a)). Next, the two polarizing glasses 10 are bonded together so that the surfaces face each other, and the orientations of the shape-anisotropic metal particles coincide with each other (refer to FIG. 2(b)). Then, metal fine particle-containing layers 14 near the unbonded surfaces are removed by polishing, etching, or the like (refer to FIG. 2(c)). As a result, the polarizing glass 1 according to Embodiment 1 can be produced.

When linearly polarized wave parallel to the longitudinal direction of the shape-anisotropic metal particles is incident on the conventional polarizing glass 10, relatively high reflectance occurs due to the presence of a high concentration of metal near the surfaces, thereby producing reflected light. In this case, the concentration of metal fine particles is high at the glass surfaces, and thus like in reflection by a mirror, high reflectance is exhibited. However, in the polarizing glass 1 according to this embodiment, linearly polarized wave enters the polarizing glass 1 without being reflected by the surface metal, and reflectance gradually increases as the concentration of metal fine particles slowly increases. However, the intensity of linearly polarized wave also gradually decreases due to plasma absorption by the metal fine particles. Therefore, even when the linearly polarized wave reaches a portion (joint surface) containing a high concentration of metal, the intensity of reflected light is lower than that of a conventional type.

FIG. 3 is an explanatory view of a polarizing glass according to Embodiment 2 of the present invention, in which FIG. 3(a) is a partial sectional view of a polarizing glass, according to Embodiment 2 of the present invention and FIG. 3(b) is a diagram showing a concentration distribution of metal particles in the travel direction of light in which a polarizing function is performed in the polarizing glass according to Embodiment 2 of the present invention. As shown in FIG. 3, like the polarizing glass according to Embodiment 1. the polarizing glass 1 according to Embodiment 2 is produced by bonding two conventional polarizing glasses each including shape-anisotropic metal particle layers formed near both main surfaces by ion exchange. However, the two polarizing glasses used are different from those in Embodiment 1.

That is, in each of the two polarizing glasses used in Embodiment 2, the concentration of shape-anisotropic metal particles is made relatively low on the outermost surfaces by two-step ion exchange, becomes the maximum at positions of several μm inward of the outermost surfaces, and gradually decreases inwardly. Namely, the concentration of shape-anisotropic metal particles has a distribution in which the concentration more slowly changes inwardly from the position at the maximum metal fine particle concentration to the position at substantially zero concentration than the concentration changes from the outermost surfaces to the position at the maximum metal fine particle concentration. The polarizing glass according to this embodiment is capable of further suppressing light reflection because the metal fine particle concentration slowly changes.

The present invention is described in further detail below with reference to examples.

EXAMPLE 1

A molten salt containing sodium nitrate and silver nitrate at 2:1 by we was heated to 450° C., and a commercial white sheet glass having a thickness of 2 mm was immersed for 50 hours to perform ion exchange between sodium in the glass and silver ions in the molten salt. Then, the white sheet glass subjected to ion exchange was heat-treated at 650° C. for 10 hours to precipitate spherical silver fine particles of about 45 nm. The silver fine particles were confirmed to a depth of 30 µm from either surface of the white sheet glass.

Then, the glass sheet in which the silver fine particles were precipitated was heated to about 700° C. and stretched. The resultant glass tape had a silver-containing layer having a thickness of 0.2±0.03 mm at a depth of 3 µm from either surface. Then, 10-mm square glass pieces cut out from the glass tape in parallel to the stretch direction were used as sample (C) (corresponding to a conventional polarizing glass).

The silver-containing layers of two samples (C) were heat-bonded together through low-melting-point glass so that the stretching directions precisely coincided with each other. Further, the unbonded surfaces of the glass pieces were equally removed by polishing to prepare sample (A) having a thickness of 0.2 mm (corresponding to the polarizing glass of Embodiment 1). In the sample (A), silver-containing layers at both glass surfaces were completely removed by polishing to leave only a silver-containing layer in the bonded portion at the center in the thickness direction. The thickness precision was 0.2±0.002 mm.

Further, one of the main surfaces of sample (C) was polished to remove the silver particle-containing layer, and two single-polished glass pieces having a thickness of 0.1 mm were formed. The silver-containing layers of two glass pieces were heat-bonded together through low-melting-point glass so that the stretching directions precisely coincided with each other to prepare sample (B) (corresponding to the polarizing glass of Embodiment 2). In the sample (B), silver-containing layers at both glass surfaces were completely removed by polishing to leave only a silver-containing layer in the bonded portion at the center in the thickness direction. The thickness precision was 0.2±0.005 mm.

Next, the extinction ratios of the samples (A), (B), and (C) were measured using a LD light source of 1.31 µm. The extinction ratio is represented by the following expression:

Extinction ratio=−10 Log($P$out−$P$in)[dB]

Even when a usual polarizing glass having a reflectance of about 0.15% has an extinction ratio of 45 dB, isolation of an optical isolator is generally about 35 dB according to the precision of the rotation angle of a garnet crystal and the bonding precision of two polarizing glasses.

Next, the results of measurement of reflectance of the samples (A), (B), and (C) are described. FIG. 4 is a drawing showing a measurement system used for measuring reflectance of the samples (A), (B), and (C). As shown in FIG. 4, light from a light source 65 is converted to linearly polarized wave in one direction when passing through a Glan-Tompson prism 61 and is incident on a measurement sample 64 through a non-polarization beam splitter 62. When there is reflected light, the reflected light is again incident on the non-polarization branching filter 62, diffracted to the direction C of a detector 63, and detected by the detector 63.

First, an Al (aluminum)-coated reflecting plate was placed at the placement position of the measurement sample 64 through a matching oil 66, and the intensity of reflected light incident on the detector 63 was measured. Next, a polarizing glass (measurement sample) 64 to be measured was placed in a direction (parallel to the stretching direction) of absorption of incident linearly polarized wave at the placement position of the measurement sample 64 through the matching oil 66, and reflected light at an angle where transmitted light b was minimized was measured. The matching oil 66 has the function to remove the influence of reflection due to a difference in refractive index between materials. The reflectance R was calculated from the ratio of reflected light P(g) of each polarizing glass sample to reflected light intensity P(Al) of the Al-coated reflecting plate according to the following expression:

$R=P(g)/P(Al)$

Then, optical isolators were assembled using two each of the samples (A), (B), and (C), a garnet crystal having a plane of polarization rotating by 45°, and a permanent magnet, and the isolation value of each optical isolator was measured. The results are shown in Table 1 together with the measured reflectance values of the samples (A), (B), and (C).

TABLE 1

| Result of optical measurement | | | |
|---|---|---|---|
| | Extinction ratio | Reflectance | Isolation |
| Sample (A) this invention | 45.1 dB | 1.4% | 33.0 dB |
| Sample (B) this invention | 45.2 dB | 1.3% | 33.3 dB |
| Sample (C) conventional example | 45.5 dB | 8.6% | 21.2 dB |

EXAMPLE 2

Two glass sheets subjected to ion exchange and heat treatment for precipitating silver fine particles by the same method as in Example 1 were heat-bonded together through low-melting-point glass so that the silver fine particle-containing layers faced each other. The glass sheets were heat-stretched at about 710° C. to prepare a glass tape having a thickness of 0.4±0.05 mm. Then, 10-mm square samples were cut out from the glass tape in a direction parallel to the stretching direction, and each sample was finished to a thickness of 0.2 mm by equally polishing both surfaces and used as sample (D). In the sample (D), silver-containing layers at both glass surfaces were completely removed by polishing to leave only a silver-containing layer having a thickness of about 6 µm in the bonded portion at the center in the thickness direction. The thickness precision of the sample (D) was 0.2±0.002 mm.

The extinction ratio and reflectance of sample (D) were measured by the same method as in Example 1. An isolator was formed using two samples (D) by the same method as in Example 1, and isolation was measured. The results are shown in Table 2 described below. Then, 5-mm square samples were cut out from the glass tape in a direction parallel to the stretching direction, and each sample was finished to a thickness of 30 µm by equally polishing both surfaces and used as sample (E). The thickness precision of the sample (E) was 30±8 µm. In the sample (E), silver-containing layers at both glass surfaces were completely removed by polishing to leave only a silver-containing layer having a thickness of about 6 μm in the bonded portion at the center in the thickness direction.

The extinction ratio and reflectance of sample (E) were measured by the same method as in Example 1. An isolator was formed using two samples (E) by the same method as in Example 1, and isolation was measured. The results are shown in Table 2 described below.

EXAMPLE 3

A white sheet having a thickness of 1.5 mm was subjected to ion exchange by the same method as in Example 1. Then, two glass sheets were placed on a flat alumina plate so that the ion exchange surfaces faced each other and heat-treated at 650° C. for 10 hours under a ceramic plate weight of about 2 Kg. As a result, the two glass sheets were fused, and the thickness of the glass sheet was 2.8 mm. In the fused glass sheet, substantially spherical silver fine particles of about 50 nm were precipitated to a depth of 30 μm from either surface of the fused glass sheet. Also, substantially spherical silver fine particles of about 45 nm were precipitated over a thickness of 60 μm at the center of the fused glass sheet in the thickness direction.

Then, the fused glass sheet in which silver fine particles were precipitated was heat-stretched at about 710° C. The resultant glass tape had a thickness of 0.28±0.03 mm. Then, 10-mm square samples were cut out from the glass tape in a direction parallel to the stretching direction, and each sample was finished to a thickness of 0.2 mm by equally etching both surfaces by immersion in an aqueous hydrofluoric acid solution as an etching solution and used as sample (F). In the sample (F), silver-containing layers at both glass surfaces were completely removed by etching to leave only a silver-containing layer having a thickness of about 6 μm in the fused portion at the center in the thickness direction. The thickness precision of the sample (F) was 0.2±0.01 mm. The extinction ratio and reflectance of sample (F) were measured by the same method as in Example 1. An isolator was formed using two samples (F) by the same method as in Example 1, and isolation was measured. The results are shown in Table 2 described below.

EXAMPLE 4

A Cr film was deposited to a thickness of 0.5 μm by evaporation on one of the surfaces of a white sheet having a thickness of 1.1 mm, and the white sheet was subjected to ion exchange by the same method as in Example 1. Then, the ion exchange surface was masked with an acid-resistant tape, and only the Cr film was separated with a mixed acid of sulfuric acid and hydrofluoric acid. Then, the acid-resistant tape was removed, and the ion exchange surfaces of the two sheets were allowed to face each other. The two glass sheets were fused by the same heat treatment as in Example 3, and at the same time, silver fine particles were precipitated. As a result, the thickness of the fused glass sheet was 2.0 mm, and silver fine particles were not precipitated at both surfaces of the fused glass sheet. Also, substantially spherical silver fine particles of about 45 nm were precipitated over a thickness of 60 μm at the center of the fused glass sheet in the thickness direction.

Then, the fused glass sheet in which silver fine particles were precipitated was heat-stretched at about 700° C. The resultant glass tape had a thickness of 0.2±0.03 mm. Then, 10-mm square samples were cut out from the glass tape in a direction parallel to the stretching direction, and used as sample (G). The sample (G) had only a silver-containing layer having a thickness of about 6 μm in the fused portion at the center in the thickness direction. The extinction ratio and reflectance of sample (G) were measured by the same method as in Example 1. An isolator was formed using two samples (G) by the same method as in Example 1, and isolation was measured. The results are shown in Table 2 described below.

EXAMPLE 5

A molten salt containing sodium nitrate and silver nitrate at 4:1 by wt % was heated to 480° C., and a commercial white sheet glass having a thickness of 2 mm was immersed for 150 hours to perform ion exchange between sodium in the glass and silver ions in the molten salt. Then, the white sheet glass subjected to ion exchange was immersed in a molten salt of sodium nitrate at 400° C. for 70 hours to decrease the silver ion concentration near the glass surfaces and then heat-treated in a hydrogen atmosphere at a temperature of 620° C. for 10 hours to precipitate spherical silver fine particles of about 50 nm. The silver fine particles were confirmed to a depth of 90 μm from either surface of the white sheet glass. Then, the glass sheet in which the silver fine particles were precipitated was heated to about 700° C. and stretched. The resultant glass tape had a silver-containing layer having a thickness of 0.2±0.03 mm at a depth of 9 μm from either surface. The silver particle concentration is maximized at a position of 3 μm inward of the outermost surfaces, gradually decreases in the inward direction, and becomes substantially zero at a position of 9 μm from the outermost surfaces.

Then, 10-mm square glass pieces were cut out from the glass tape in parallel to the stretch direction and used as sample (I). Further, one of the main surfaces of sample (I) was polished, and two single-polished glass pieces having a thickness of 0.1 mm were formed. The silver-containing layers of the two glass pieces were bonded together using a UV curable resin so that the stretching directions precisely coincided with each other to prepare sample (H). In the sample (H), silver-containing layers at both glass surfaces were completely removed by polishing to leave only a silver-containing layer in the bonded portion at the center in the thickness direction. The thickness precision of the sample (H) was 0.2±0.003 mm. The extinction ratio and reflectance of samples (H) and (I) were measured by the same method as in Example 1. Isolators were formed using two each of sample (H) and sample (I) by the same method as in Example 1, and isolation was measured. The results are shown in Table 2.

TABLE 2

Result of optical measurement

| | Extinction ratio | Reflectance | Isolation |
| --- | --- | --- | --- |
| Sample (D) this invention | 45.5 dB | 1.4% | 33.4 dB |
| Sample (E) this invention | 45.4 dB | 1.4% | 33.2 dB |
| Sample (F) this invention | 45.1 dB | 1.3% | 33.2 dB |
| Sample (G) this invention | 45.4 dB | 1.3% | 33.3 dB |
| Sample (H) this invention | 40.9 dB | 1.0% | 31.2 dB |
| Sample (I) conventional example | 41.3 dB | 4.1% | 26.6 dB |

INDUSTRIAL APPLICABILITY

The present invention can be used as a polarizer which is an important component of a small optical isolator, an optical switch, an electromagnetic sensor, or the like, used in, for example, optical communication.

BRIEF DESCRIPTION OF DRAWINGS

FIG. 1 is an explanatory view of a polarizing glass according to Embodiment 1 of the present invention, in which FIG. 1(a) is a partial sectional view of a polarizing glass, according to Embodiment 1 of the present invention and FIG. 1(b) is a diagram showing a concentration distribution of metal particles of Ag or the like in the travel direction of light having a polarizing function in the polarizing glass according to Embodiment 1 of the present invention.

FIG. 3 is an explanatory view of a polarizing glass according to Embodiment 2 of the present invention, in which FIG. 3(a) is a partial sectional view of a polarizing glass, according to Embodiment 2 of the present invention and FIG. 3(b) is a diagram showing a concentration distribution of metal particles in the travel direction of light in which a polarizing function is performed in the polarizing glass according to Embodiment 2 of the present invention.

FIG. 5 is an explanatory view of a conventional polarizing glass, in which FIG. 5(a) is a partial sectional view of a conventional polarizing glass, and FIG. 5(b) is a diagram showing an Ag particle concentration distribution in the travel direction of light in which a polarizing function is performed in a conventional polarizing glass.

Figure 1:
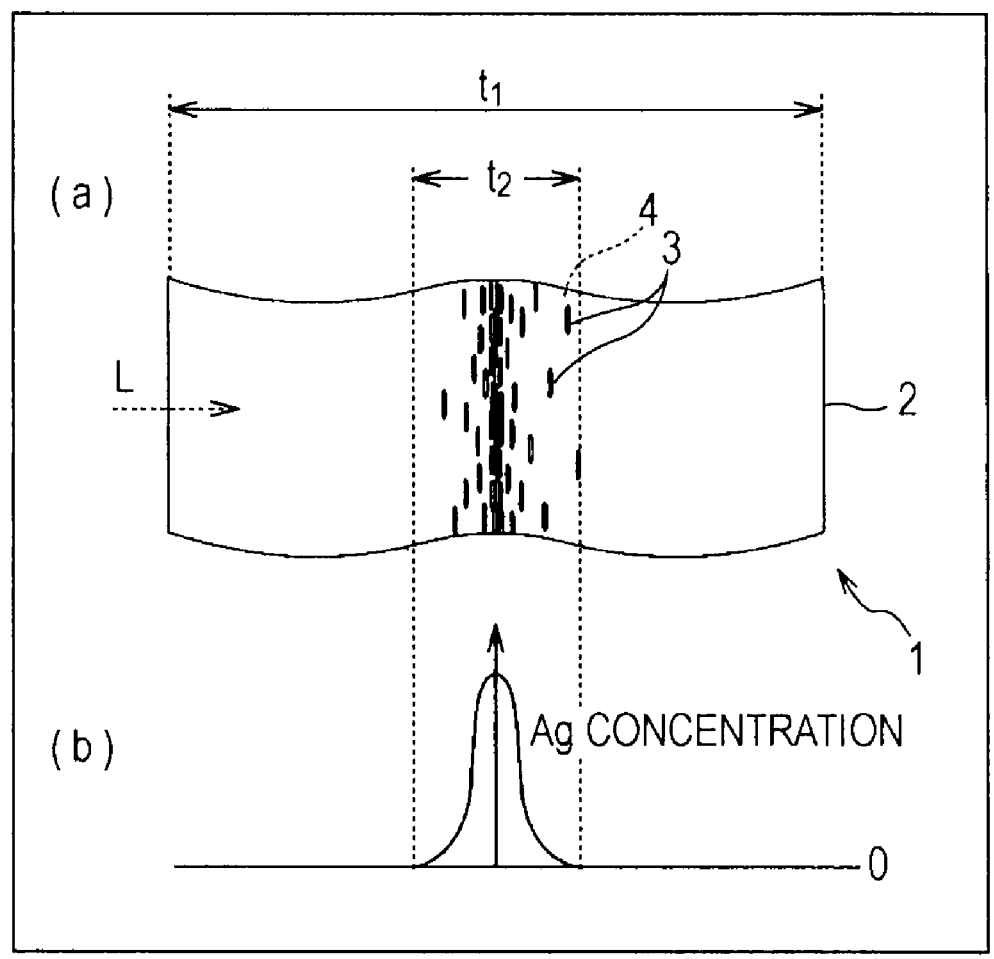
Figure 2:
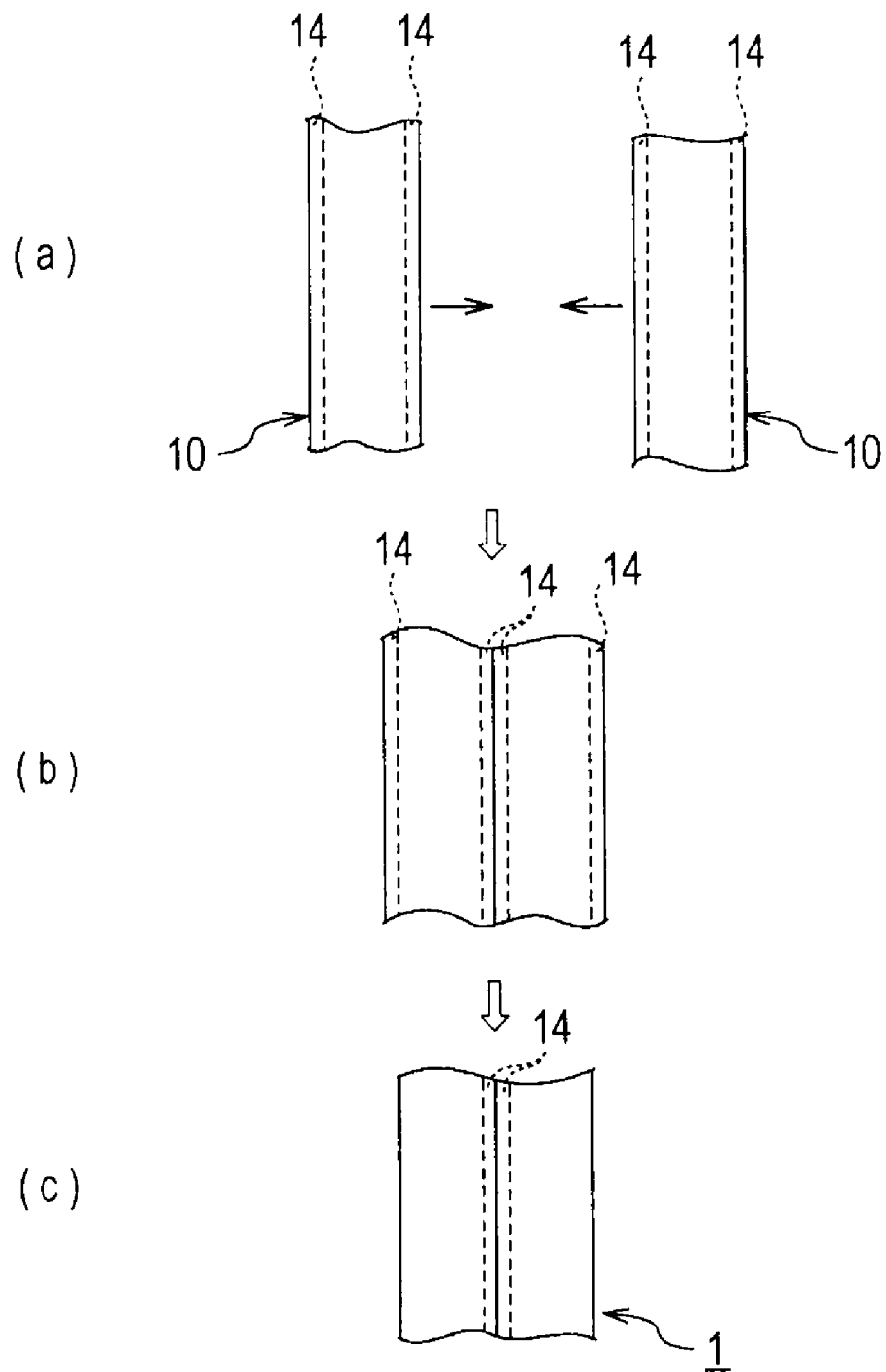
FIG. 2 is an explanatory view of a process for producing the polarizing glass 1 according to Embodiment 1.
Figure 3:
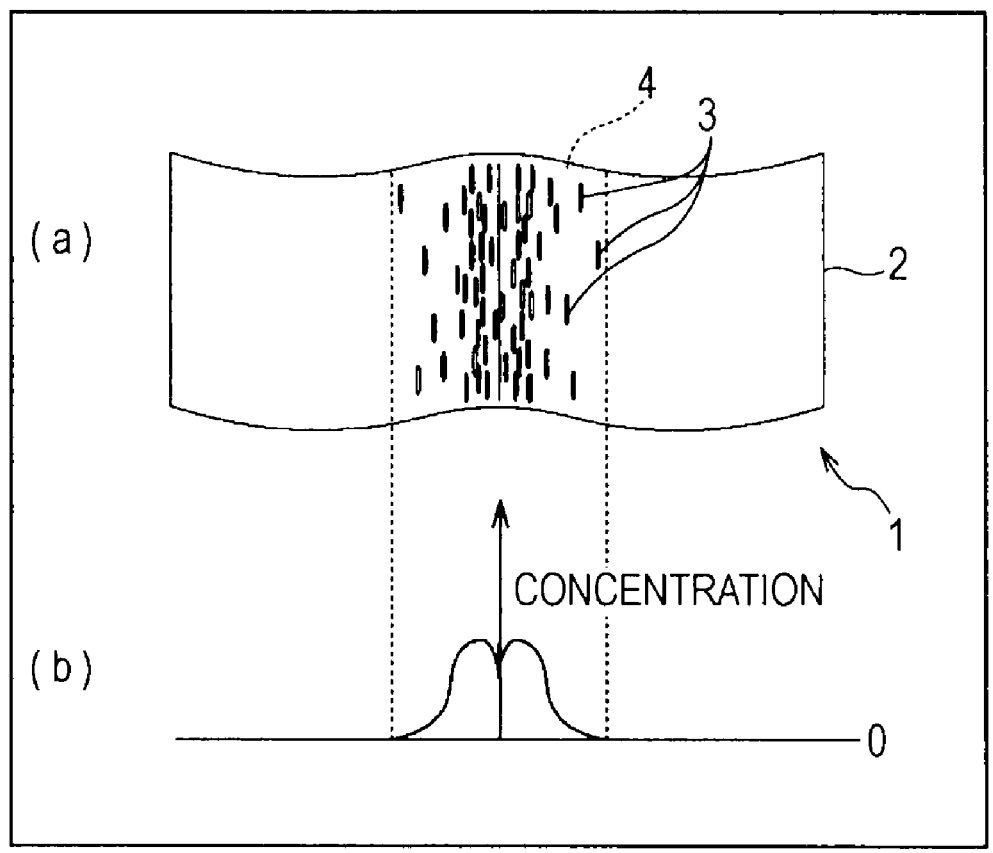
Figure 4:
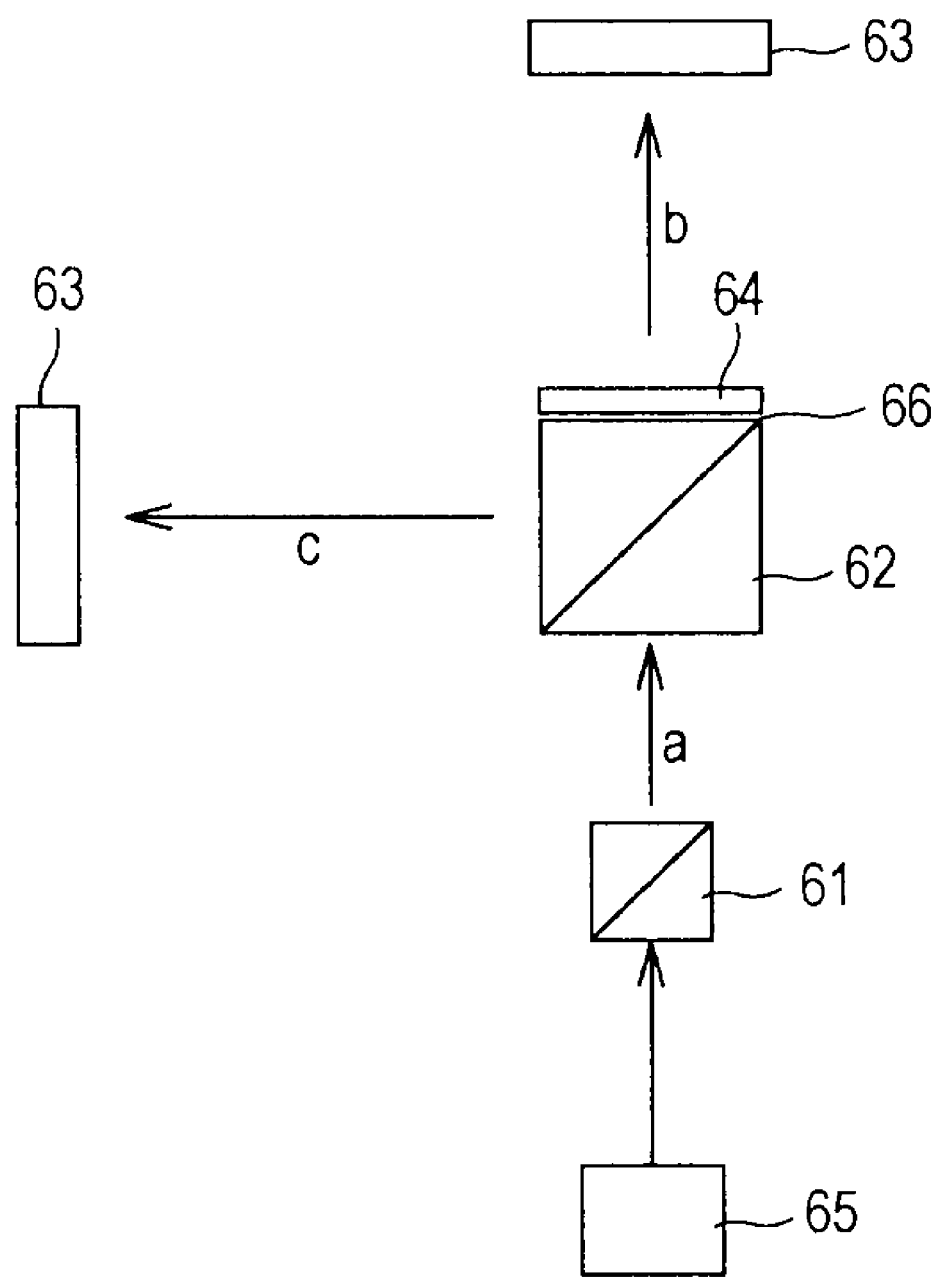
FIG. 4 is a drawing showing a measurement system used for measuring reflectance of the samples (A) to (I).
Figure 5:
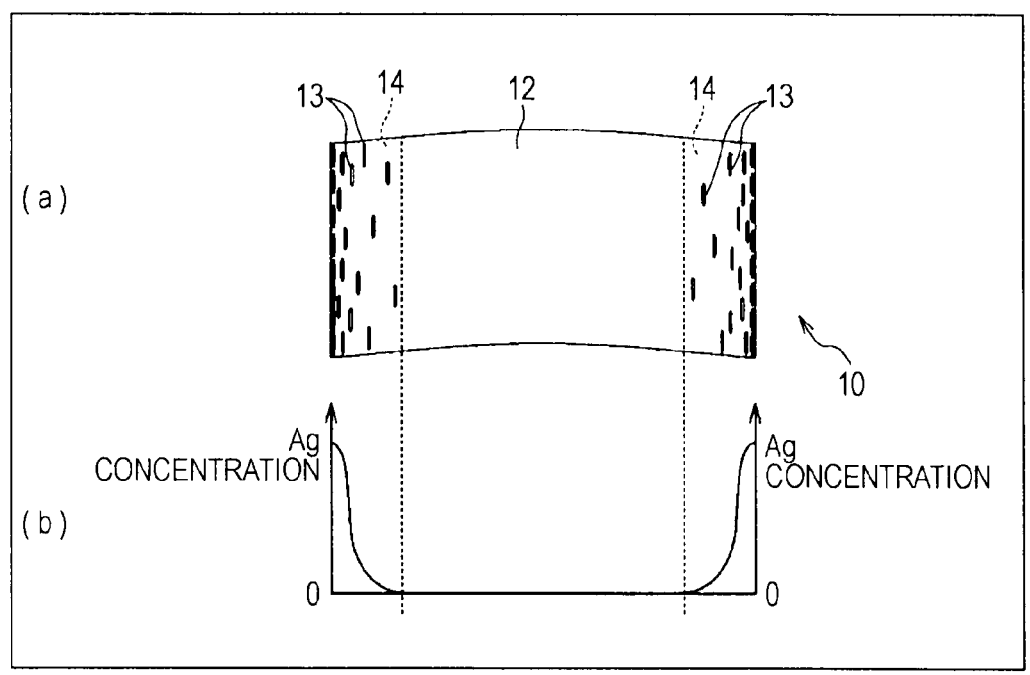
Figure 6:
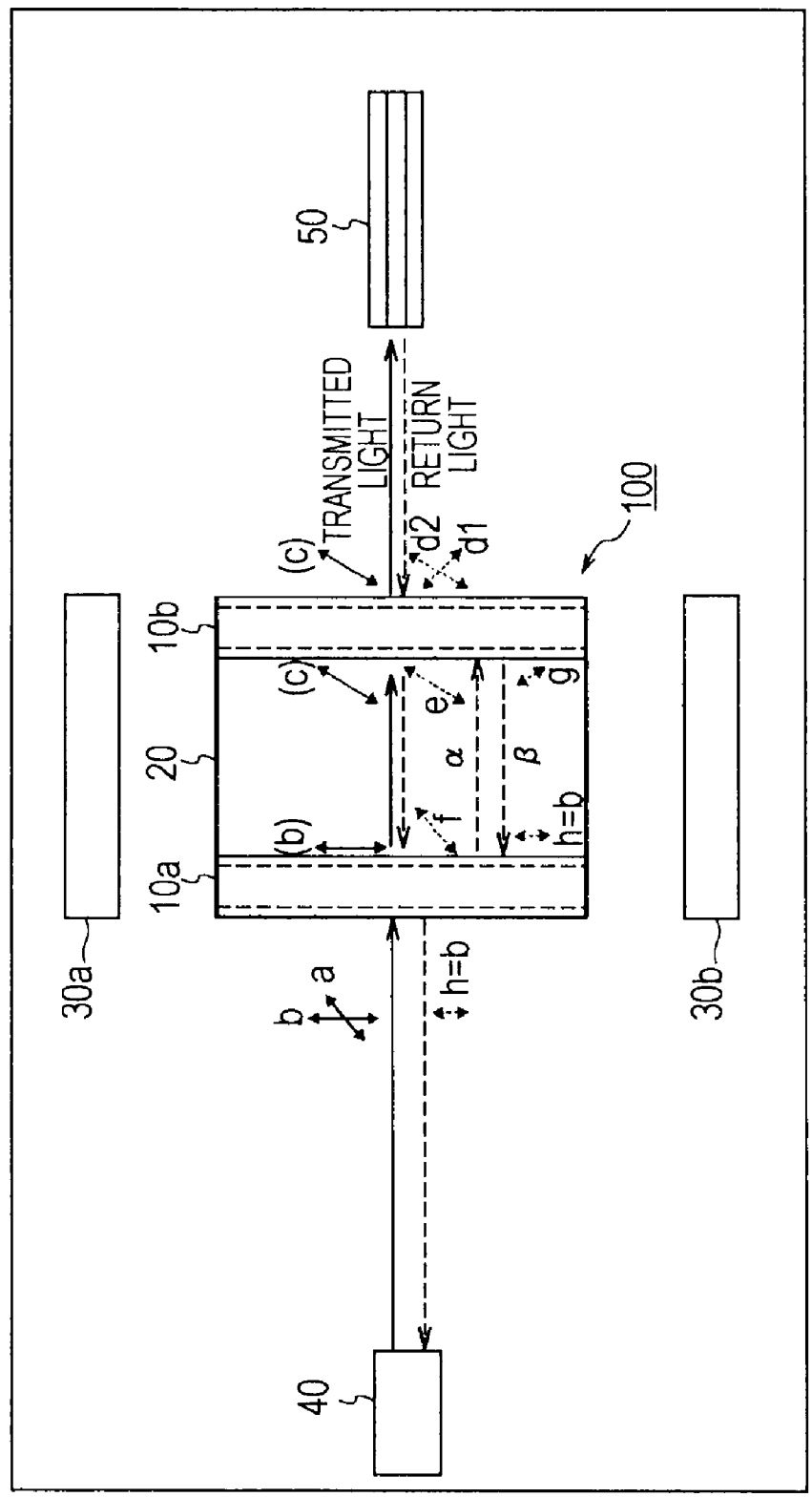
FIG. 6 is an explanatory view of the operation of an optical isolator formed using a conventional polarizing glass.
Figure 7:
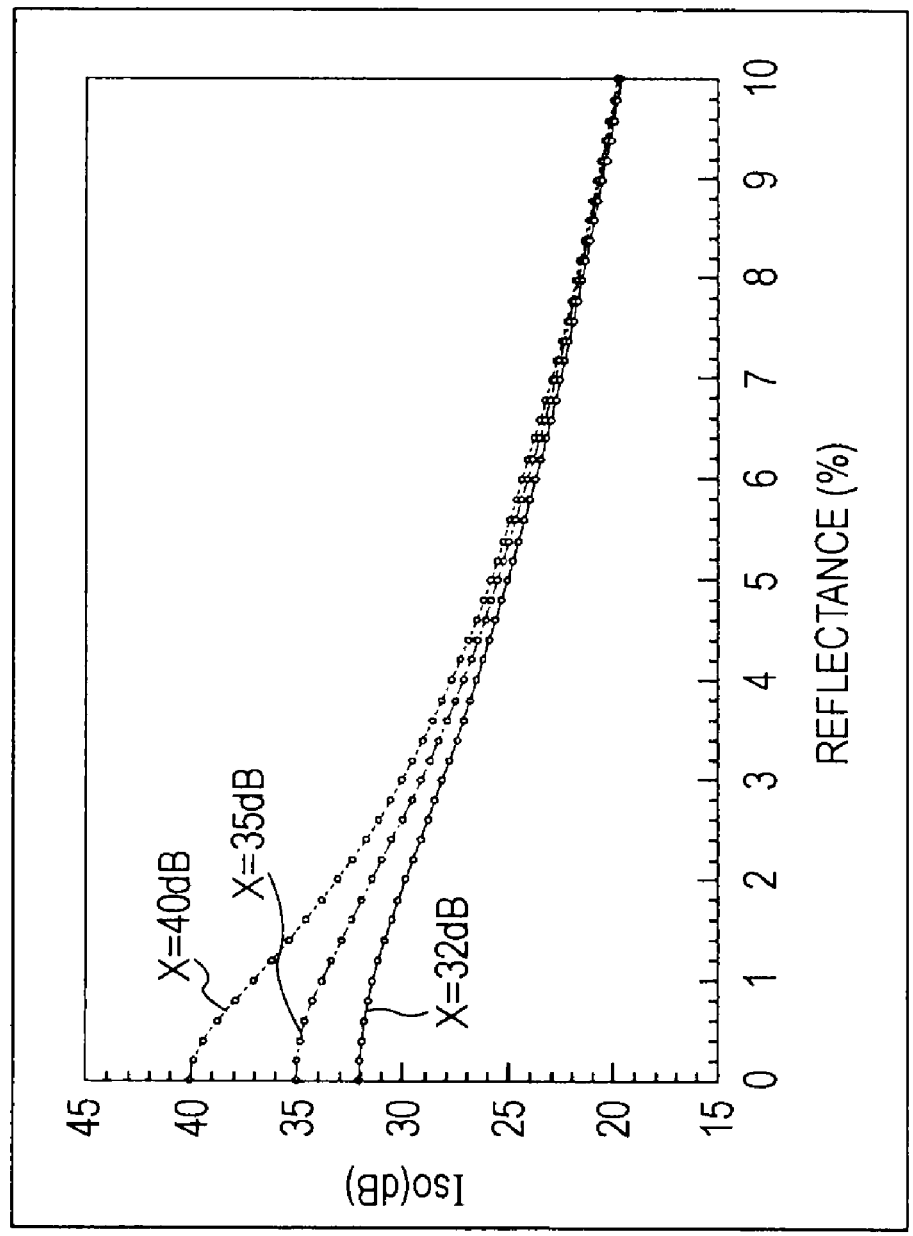
FIG. 7 is a graph showing a relationship between reflectance R of linearly polarized light in the absorption direction of a polarizing glass and isolation thereof.

REFERENCE NUMERALS 1 polarizing glass
2 glass substrate
3 metal fine particle
4 region where metal fine particles are present

The invention claimed is:

1. A polarizing glass, comprising:
shape-anisotropic metal particles oriented and dispersed in a glass substrate;
wherein:
a concentration distribution of the metal particles exists within the glass substrate along a direction in which light travels when a polarizing function is performed;
the concentration of metal particles is substantially zero near a first surface and an opposite second surface of the glass substrate; and
the concentration of metal particles gradually increases with increasing distance from the first surface until reaching a value within a predetermined range and then gradually decreases with decreasing distance from the second surface.

2. The polarizing glass according to claim 1, wherein the metal particles are metallic silver fine particles or metallic copper fine particles.

3. The polarizing glass according to claim 1, wherein a total thickness of a layer containing the shape-anisotropic metal particles is 20 μm or less.

4. The polarizing glass according to claim 1, wherein a total thickness of the polarizing glass is 50 μm or less.

5. The polarizing glass according to claim 1, wherein an extinction ratio for one or both of light in a wavelength band having a center wavelength of 1.31 μm and light in a wavelength band having a center wavelength of 1.55 μm is 30 dB or more.

6. An optical isolator, comprising the polarizing glass according to claim 1.

7. An optical isolator, comprising:
a Faraday rotating element; and
at least one polarizer;
wherein the at least one polarizer comprises the polarizing glass according to claim 1.

8. The polarizing glass according to claim 1, wherein:
the glass substrate comprises a first region, a second region, and a third region arranged in sequence along the direction in which light travels when the polarizing function is performed;
the metal particles are present in the second region; and
the first region and the third region are substantially free of the metal particles.

9. The polarizing glass according to claim 8, wherein:
a thickness of the second region along the direction in which light travels when the polarizing function is performed is from 5 to 30 μm; and
a total thickness of the first region, the second region, and the third region along the direction in which light travels when the polarizing function is performed is from 0.03 to 0.6 mm.

10. A method for producing a polarizing glass comprising shape-anisotropic metal particles oriented and dispersed in a glass substrate, the method comprising:
bonding a first polarizing glass having a metal particle-containing layer on at least one main surface to a second polarizing glass having a metal particle-containing layer on at least one main surface so that orientation directions of the metal particles coincide with each other and the main surfaces having the metal particle-containing layers face each other, each of the metal particle-containing layers having a concentration distribution such that a concentration of the shape-anisotropic metal particles decreases from a first surface toward a second surface adjacent to the respective first or second polarizing glass; and
removing the metal particle-containing layer from the unbonded main surface of the first polarizing glass and/or the unbonded main surface of the second polarizing glass, if present;
wherein:
a concentration distribution of the metal particles exists within the obtained polarizing glass along a direction in which light travels when a polarizing function is performed;
the concentration of metal particles is substantially zero near a first surface and an opposite second surface of the obtained polarizing glass; and
the concentration of metal particles gradually increases with increasing distance from the first surface of the obtained polarizing glass until reaching a value within a predetermined range and then gradually decreases with decreasing distance from the second surface of the obtained polarizing glass.

11. A method for producing a polarizing glass, comprising:
introducing metal ions into main surfaces of at least two glass substrates by an ion exchange process to prepare a first metal ion-containing glass substrate and a second metal ion-containing glass substrate, each including a metal ion-containing layer having a concentration distribution in which the metal ion concentration decreases from the main surfaces toward an interior of the substrates;

heating the first and second metal ion-containing glass substrates to produce metal particles to obtain first and second metal particle-containing glass substrates, each including a metal particle-containing layer having a concentration distribution in which the metal particle concentration decreases from the main surfaces toward the interior of the substrates; and bonding at least one of the main surfaces of the first metal particle-containing glass substrate to at least one of the main surfaces of the second metal particle-containing glass substrate, and then heat-stretching the substrates to form the metal particles into shape-anisotropic metal particles oriented in one direction;

wherein:

a concentration of metal particles within the obtained polarizing glass is distributed along a direction in which light travels when a polarizing function is performed;

the concentration of metal particles is substantially zero near a first surface and a second surface of the obtained polarizing glass; and the concentration of metal particles gradually increases with increasing distance from the first surface of the obtained polarizing glass until reaching a value within a predetermined range and then gradually decreases with decreasing distance from the second surface of the obtained polarizing glass.

* * * * *